(12) United States Patent
Bhakta et al.

(10) Patent No.: US 12,231,527 B2
(45) Date of Patent: Feb. 18, 2025

(54) CLOCK RECOVERY TRAINING

(71) Applicant: TEXAS INSTRUMENTS INCORPORATED, Dallas, TX (US)

(72) Inventors: Bhavesh Bhakta, Richardson, TX (US); Paul Marion Miller, IV, Farmers Branch, TX (US); Mark Ryan Love, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 160 days.

(21) Appl. No.: 17/354,752

(22) Filed: Jun. 22, 2021

(65) Prior Publication Data

US 2022/0407674 A1 Dec. 22, 2022

(51) Int. Cl.
*H04L 7/00* (2006.01)
*H04L 7/06* (2006.01)
*G06F 1/12* (2006.01)

(52) U.S. Cl.
CPC .......... *H04L 7/0012* (2013.01); *H04L 7/0037* (2013.01); *H04L 7/06* (2013.01); *G06F 1/12* (2013.01)

(58) Field of Classification Search
CPC ..................................... G06F 1/12; H04L 7/00
See application file for complete search history.

(56) References Cited

U.S. PATENT DOCUMENTS

| 9,209,960 B1* | 12/2015 | Leung | H04L 7/0025 |
| 2019/0173661 A1* | 6/2019 | Aleksic | H04L 25/03057 |
| 2019/0288830 A1* | 9/2019 | Zhuang | H04L 7/0337 |
| 2020/0036507 A1* | 1/2020 | Matsui | H04L 7/027 |
| 2021/0224218 A1* | 7/2021 | Lin | G06F 13/4282 |

* cited by examiner

*Primary Examiner* — Phil K Nguyen
(74) *Attorney, Agent, or Firm* — Michelle F. Murray; Frank D. Cimino (57) ABSTRACT

Aspects of the disclosure provide for an apparatus. In some examples, the apparatus includes a clock generator, a clock data recovery (CDR) circuit, a state machine, and an adder. The clock generator is configured to determine a sampling clock based on a received input clock and a clock offset. The CDR circuit is configured to determine a phase of the input clock and determine CDR codes based on the determined phase and sampled data. The state machine is configured to record a first CDR code of the CDR codes at a first time, record a second CDR code of the CDR codes at a second time subsequent to the first time, and determine a calibrated offset based on the first CDR code and the second CDR code. The adder is configured to determine the clock offset according to the CDR codes and the calibrated offset.

14 Claims, 5 Drawing Sheets

CLOCK RECOVERY TRAINING

BACKGROUND

Some communications between electronic devices include multiple components. For example, a first component may be a data component and a second component may be a clock component. A receiving device may interpret the data component based on the clock component, such as to understand the timing of bit values represented in the data component.

SUMMARY

Aspects of the disclosure provide for an apparatus. In some examples, the apparatus includes a clock generator, a clock data recovery (CDR) circuit, a state machine, and an adder. The clock generator is configured to determine a sampling clock based on a received input clock and a clock offset. The CDR circuit is configured to determine a phase of the input clock and determine CDR codes based on the determined phase and sampled data. The state machine is configured to record a first CDR code of the CDR codes at a first time, record a second CDR code of the CDR codes at a second time subsequent to the first time, and determine a calibrated offset based on the first CDR code and the second CDR code. The adder is configured to determine the clock offset according to the CDR codes and the calibrated offset.

Other aspects of the disclosure provide for a method. In some examples, the method includes determining a first CDR code of a CDR circuit at a first time, determining a second CDR code of the CDR circuit at a second time subsequent to the first time, generating a sampling clock for sampling a received data signal according to the first CDR code while the CDR circuit is active, determining a clock offset based on the first CDR code and the second CDR code, and generating the sampling clock according to the clock offset responsive to disabling of the CDR circuit.

Other aspects of the disclosure provide for a system. In some examples, the system includes a transmitter and a receiver. The transmitter is configured to operate in a first mode in which the transmitter transmits a first data frame including a first header followed by multiple periodic training patterns (PTPs) and operate in a second mode in which the transmitter transmits a second data frame including a second header followed by payload data. The receiver is coupled to the transmitter and the receiver is configured to receive the first data frame, while operating according to the first mode, determine a clock offset related to processing the first data frame, and generate the sampling clock according to the clock offset prior to receipt of an entirety of the second header.

DETAILED DESCRIPTION

As described above, a transmitter may transmit a data component and a clock component of a communication signal to a receiver. The data component may include data while the clock component includes timing information to enable the receiver to interpret the data component in a manner intended by the transmitter. For example, the clock component may enable the receiver to accurately interpret binary values in the received data component as having a same value as that transmitted by the transmitter (e.g., a transmitted binary 1 value is interpreted after receipt as a binary 1 value and a transmitted binary 0 value is interpreted after receipt as a binary 0 value). Propagation delays, channel delays, signal drift, and other considerations may cause a mismatch, or a lack of coordination, in the data component and the clock component such that the receiver may instead interpret a transmitted binary 1 value as a received binary 0 value, or vice versa. This may be further exacerbated in a high-speed communication system, such as a high-speed serial interface (HSSI) in which sampling of the data component may be performed with precise timing to provide an accurate sampling of the data component.

To compensate for these potential errors resulting from a mismatch between the clock component and the data component, the receiver may include a clock data recovery (CDR) circuit. The CDR circuit may periodically determine a timing of the clock component with respect to the data component such that timing errors are mitigated and errors in the receiver interpreting the data component (e.g., such as bit errors) are reduced. The CDR circuit, in some receivers, may consume a large percentage of overall power consumed by the receiver. Therefore, some receiver implementations may disable the CDR circuit between instances of performing training or synchronization between the clock component and the data component (such as disabling the CDR circuit while processing a payload of the data component), thereby reducing power consumption of the receiver. However, in at least some examples, disabling the CDR circuit may change a load placed on a power supply that provides power to the receiver, changing at least some characteristics of a power signal provided by the power supply to the receiver. The changed characteristic(s) of the power signal provided by the power supply may alter certain delays in the receiver, such as propagation delays in complementary metal-oxide-semiconductor (CMOS) components of the receiver, shifting the recovered clock signal from its trained location. These changed delays may again cause a mismatch between the clock component and the data component such that errors in the receiver interpreting the data component are increased.

This description includes various examples of a circuit configured to mitigate timing errors between received clock and data components of a signal. The circuit may be implemented in devices in which timing is a relevant consideration, such as data communication (e.g., a Universal Serial Bus receiver), low-latency implementations such as a hard disk drive or other data storage device, data presentation devices, such as Digital Light Processing (DLP) projectors or other devices, audio receivers, etc. The receiver may generate a sampling clock based on the received clock component (e.g., such as by delaying the received clock component for a programmed amount of time). In at least some examples, the circuit includes, or is adapted to couple to, a state machine configured to determine a digital offset to the clock component. The circuit may also include an adder configured to add the digital offset to an output of a CDR circuit (such as a clock interpolator code) of the receiver. The digital offset, in at least some examples, may be selectively applied or removed by the state machine to offset timing of the sampling clock to mitigate effects of the change in characteristics of power provided by the power supply on the sampling clock. In at least some examples, determining and applying the digital offset may reduce bit errors of the receiver by offsetting the sampling clock to compensate for the shift caused in the sampling clock by the change in characteristics of power provided by the power supply. Thus, the challenges described above may be mitigated.

Figure 1:
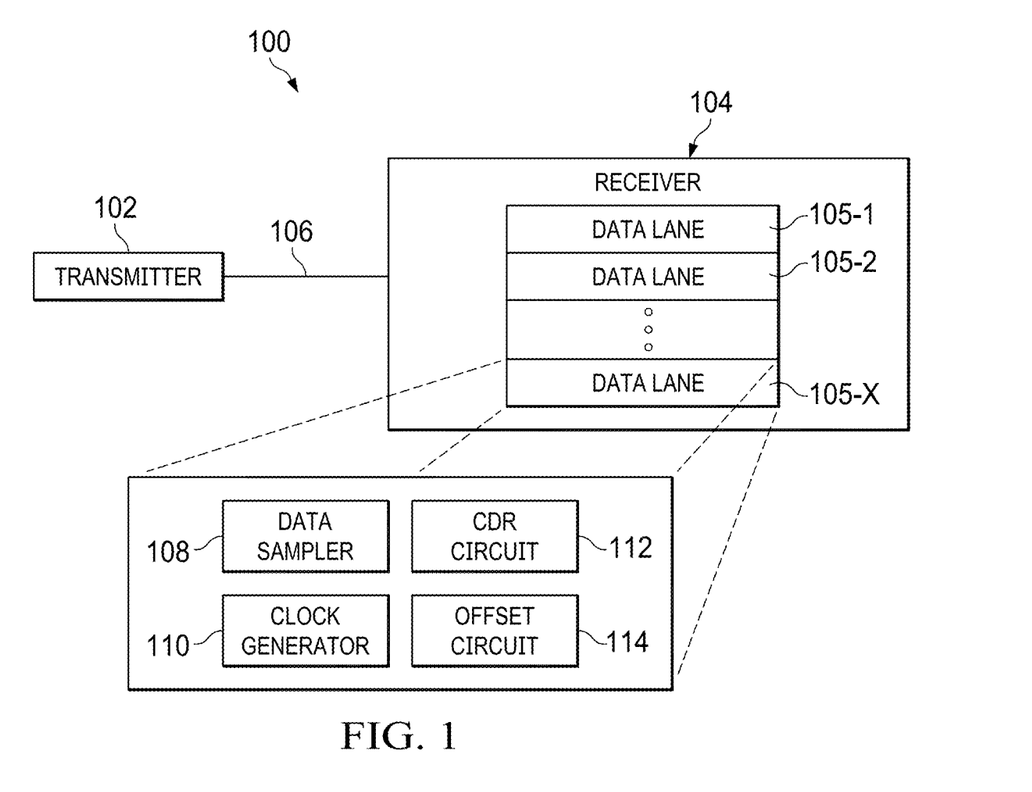
FIG. 1 is a block diagram of an example system.

FIG. 1 is a block diagram of an example system 100. In at least some examples, the system 100 is any system, device, apparatus, or other component that includes a transmitter 102 and a receiver 104 configured to communicate via a communication channel 106. For example, the system 100 may be any system with a serial data link that includes CDR and permits CDR circuitry to be enabled or disabled programmably. In at least some examples, one or both of the transmitter 102 and/or the receiver 104 may be a transceiver such that bi-directional communication is supported. The communication channel 106 may be any suitable type of communication channel, such as wireless, optical, electrical, etc. In some examples, the transmitter 102 and the receiver 104 are located in a same device (e.g., are components of a same device). In other examples, the transmitter 102 is located in, and a component of, a first device and the receiver 104 is located in, and a component of, a second device that is communicatively coupled to the first device via the communication channel 106. In at least some examples, the communication channel 106 may be a component of a HSSI.

In an example of operation, the transmitter 102 transmits data and a clock signal to the receiver 104. The receiver 104, in at least some examples, includes a data sampler 108, a clock generator 110, a CDR circuit 112, and an offset circuit 114. The clock generator 110 is configured to receive the clock signal from the transmitter 102 and generate a sampling clock. The data sampler 108 may sample the data received from the transmitter 102 according to the sampling clock to generate sampled data. In at least some examples, the data received from the transmitter 102 includes a header and a payload. The header may be useful for training the receiver 104, such as to synchronize timing of the received data and the sampling clock. The CDR circuit 112 may determine a clock interpolator code, such as may be useful to the clock generator 110 in generating the sampling clock, at least partially based on the header. The clock generator 110 may generate the sampling clock by delaying the received clock signal for an amount of time determined at least partially according to the clock interpolator code. In some examples, the CDR circuit 112 may be disabled while the data sampler 108 processes the payload of the received data. However, as described above, this can introduce errors into the sampled data resulting from a change in characteristics of power provided by a power supply (not shown) of the receiver 104.

To mitigate effects of the change in characteristics of power provided by the power supply, the offset circuit 114 may determine an offset to apply to the sampling clock. The offset may be applied substantially concurrently with disabling the CDR circuit 112 or subsequent to disabling the CDR circuit 112. Disabling of the CDR circuit 112, in at least some examples, is performed by the offset circuit 114, such as by a processing component (not shown) of the offset circuit 114 (e.g., a state machine as described elsewhere herein). In at least some examples, the communication between the transmitter 102 and the receiver 104 includes link-training. During link-training, or at power-up of the transmitter 102 and the receiver 104, or at any other programmed point in time or responsive to a trigger signal, the transmitter 102 and/or the receiver 104 enter a calibration mode in which the transmitter 102 transmits a periodic training pattern (PTP) to the receiver 104. The PTP may be a data pattern of known or specified type, such that the receiver 104 may have prior knowledge of the proper and/or correct contents of the PTP. In this way, the receiver 104 may be able to determine whether sampled data of the PTP matches, or does not match, what is expected for the PTP. For example, the receiver 104 may enter the calibration mode based on receipt of an asserted calibration mode signal (CAL). In various examples, CAL may be derived by the receiver 104 from data received from the transmitter 102, explicitly received from the transmitter 102 (e.g., such as via a secondary bus or communicative coupling between the transmitter 102 and the receiver 104), or determined according to any other suitable process. The PTP may be transmitted by the transmitter 102 in place of a payload. The offset circuit 114 may determine a digital offset to apply to the sampling clock based at least partially on the PTP.

In at least some examples, the receiver 104 may include multiple lanes. For example, the receiver 104 may include data lanes 105-1, 105-2, . . . 105-X. The multiple lanes may be configured to operate in parallel to increase a throughput of the receiver 104 such that each of the multiple lanes receives a portion of an input of the receiver 104 and outputs of each of the multiple lanes are aggregated to form an output of the receiver 104. While the calibration mode is active, the receiver 104 may enable the CDR circuit 112 for each lane for a first received PTP and save a clock interpolator code provided by the CDR circuit 112 at an end of the first PTP (e.g., saved as a code A). The receiver 104 may then disable the CDR circuit 112 for each lane and selectively reenable the CDR circuit 112 for each lane, independently, in a sequential manner. For example, the CDR circuit 112 may be reenabled for a first lane at the beginning of a second PTP and a clock interpolator code provided by the CDR circuit 112 may be saved for the first lane at an end of the second PTP. More generally, the CDR circuit 112 may be reenabled for an Nth lane at the beginning of a N+1th PTP and a clock interpolator code provided by the CDR circuit 112 may be saved for the Nth lane at an end of the N+1th PTP (e.g., saved as a code B for that respective lane of the CDR circuit 112). For each lane, the offset circuit 114 may determine the digital offset (OFFSET) to have a value of code B minus code A. After determining the digital offset, the system 100 may exit the calibration mode and enter a normal operation mode.

In some examples, while operating in the normal operation mode the receiver 104 may receive data from the transmitter 102 in the form of a frame. The frame may include a header and a payload. The header may include a PTP and a synchronization and control word (SCW). The control word may provide information to the receiver 104, such as a length of the payload, an operation for the receiver 104 to perform responsive to receipt of the frame, etc. The offset circuit 114 may apply code A as the digital offset for each lane responsive to receipt of the header. Prior to an end of the header (e.g., such as responsive to receipt of the SCW of the header or prior to receipt of the header, such as about M bits prior to the header), the offset circuit 114 may apply the determined digital offset. In various examples, M may be architecture dependent such that in some architectures M is a known or programmed value, in some architectures M is a provided value (e.g., such as provided to the receiver 104 by the transmitter 102), and in some architectures M is a derived value (e.g., such as derived by the receiver 104 from one or more PTPs according to any suitable process). In at least some examples, a value of M is selected such that sufficient time may exist, based on an architecture of the receiver 104, for a clock-timing relationship to settle subsequent to applying the digital offset value and prior to receipt of payload data following receipt of the header. In some examples, the receiver 104 may also disable the CDR circuit 112 at approximately a same time as the digital offset value having the determined value being provided. Also in some examples, the receiver 104 may reenable the CDR circuit 112 responsive to the SCW of the header not being identified within M bits, or M+1 bits, of data received by the receiver 104 following disabling of the CDR circuit 112. In at least some implementations, the CDR circuit 112 may also be disabled prior to an end of the header, thereby reducing power consumption of the receiver 104 while processing the payload of the data received from the transmitter 102.

Figure 2:
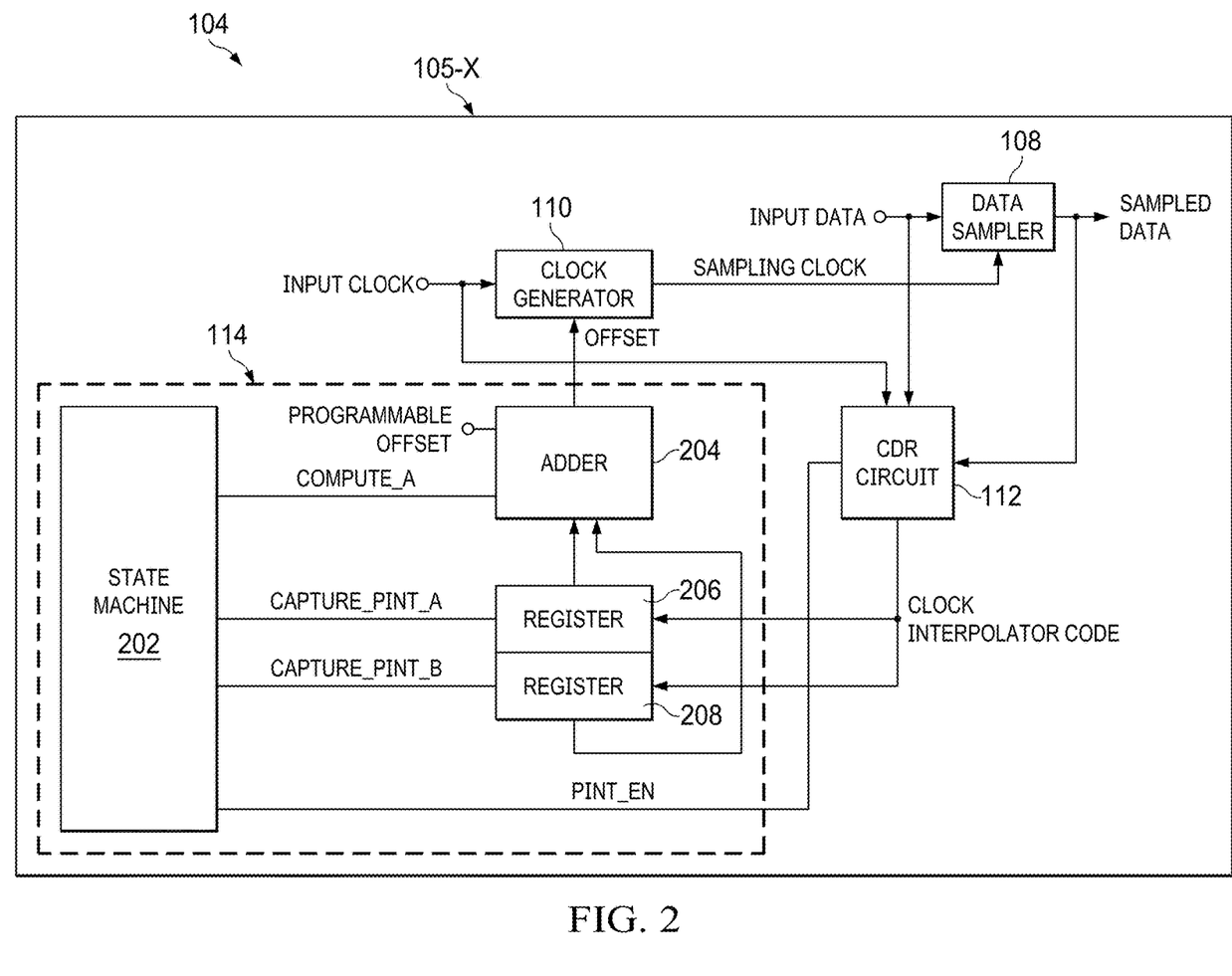
FIG. 2 is a block diagram of an example receiver.

FIG. 2 is a block diagram of an example of the receiver 104. While the receiver 104 is shown herein as having a particular topology, in various examples the receiver may have any suitable topology that includes or utilizes a CDR circuit or loop similar to the CDR circuit 112 described herein. As described above, in at least some examples, the receiver 104 includes a data sampler 108, a clock generator 110, a CDR circuit 112, and an offset circuit 114. The offset circuit 114 may include a state machine 202, an adder 204, a register 206, and a register 208. In other examples, the state machine 202 may not be included in the offset circuit 114 and may instead couple to the offset circuit 114. For example, the receiver 104 may include a state machine that couples to the offset circuit 114 of each lane of the multiple lanes of the receiver 104. In various examples, the clock generator 110 may include any suitable components for generating a sampling clock based on data received by the receiver 104. In at least some examples, the clock generator 110 may include components suitable for receiving a clock signal and generating the sampling clock by delaying the clock signal a programmed amount. In some examples, the clock generator 110 may also include components for converting a format of the received clock signal (e.g., such as a current mode logic (CIVIL) to CMOS converter). The register 206 and the register 208 may each be any suitable device capable of receiving an input signal, based on a value of a control signal, storing a value of the input signal, and providing the stored value as an output signal. In some examples, FIG. 2 may be representative of one data lane of multiple lanes the receiver 104, such as the data lane 105-X. Each respective data lane of the receiver 104 may include an instance of the data sampler 108, the clock generator 110, the CDR circuit 112, the adder 204, the register 206, and the register 208. In some examples, the receiver 104 may include a single state machine 202 that interacts with each of the data lanes (and may interact with other components, if present) of the receiver 104. In other examples, each data lane of the receiver 104 may include an instance of the state machine 202. Only one data lane of the receiver 104 is shown for the sake of ease of description and simplicity of understanding. However, any other number of lanes may also be present and function in a manner substantially similar to the lane shown and described herein.

In at least some examples, the data sampler 108 is configured to receive an input data signal, such as from the transmitter 102 or another suitable transmitter, and receive a sampling clock from the clock generator 110. The clock generator 110 is configured to receive an input clock, such as from the transmitter 102 or another suitable component and provide the sampling clock. In at least some examples, the clock generator 110 also receives a control code from the offset circuit 114. In some examples, that control code is code A. In other examples, that control code is OFFSET. The CDR circuit 112 may receive the input clock signal and sampled data provided by the data sampler 108, and may provide a clock interpolator code, or recovered clock interpolator code. In some examples, the clock interpolator code is a digital value that indicates a delay for the clock generator 110 to apply to the input clock to generate the sampling clock. However, as described above, responsive to the CDR circuit 112 being disabled after having provided the clock interpolator code, a change in power draw in the system resulting from the disabling of the CDR circuit 112 may cause a shift in position with respect to time of a rising edge of the sampling clock, adversely affecting operation of the data sampler 108. For example, the shift in position may cause the rising edge of the sampling clock to shift from approximately a middle of a unit interval of the input data signal. A unit interval of the input data signal may be defined herein as the time period for which the input data signal is asserted or de-asserted to represent a single data bit. Thus, if the input data signal is asserted, or de-asserted, for an amount of time X (e.g., corresponding to the unit interval), the shift in position may cause the rising edge of the sampling clock to shift from a time of approximately X/2 to a time less than X/2, which may cause errors in interpretation of the input data signal, as described above.

In at least some examples, the offset circuit 114 determines OFFSET as described above and provides OFFSET to the clock generator 110 to compensate for the shift caused in the sampling clock responsive to disabling of the CDR circuit 112. For example, the offset circuit 114 may receive and store the clock interpolator code from the CDR circuit 112 at different points in time (e.g., as code A and code B, as described above). The state machine 202 may further control the adder 204 to determine a difference between the clock interpolator codes at the different points in time, such as different points in time at which different lanes of the CDR circuit 112 are active. In some examples, the adder 204 may add code A and code B, or subtract code A from code B, to form OFFSET, as described above. In at least some examples, the adder 204 may also receive a programmable offset that is added to code A and code B, or is added to a result of a subtraction or other mathematical operation between code B and code A, to form OFFSET. The programmable offset may be provided by a user for testing, system validation, or to adapt the receiver 104 to various signal or operational non-idealities such as waveform asymmetry (e.g., such as due to internal offsets), a non-ideal waveform shape, non-optimal timing selections, an IQ mismatch, etc. In at least some examples, the state machine 202 determines OFFSET for each lane of the CDR circuit 112 by enabling all lanes of the CDR circuit 112 to determine the clock interpolator code (e.g., as code A) at a first time, disabling all lanes of the CDR circuit 112, and then selectively reenabling each lane of the CDR circuit 112 individually to determine the clock interpolator code (e.g., as code B) at a second time and unique to the particular enabled lane of the CDR circuit 112.

Figure 3:
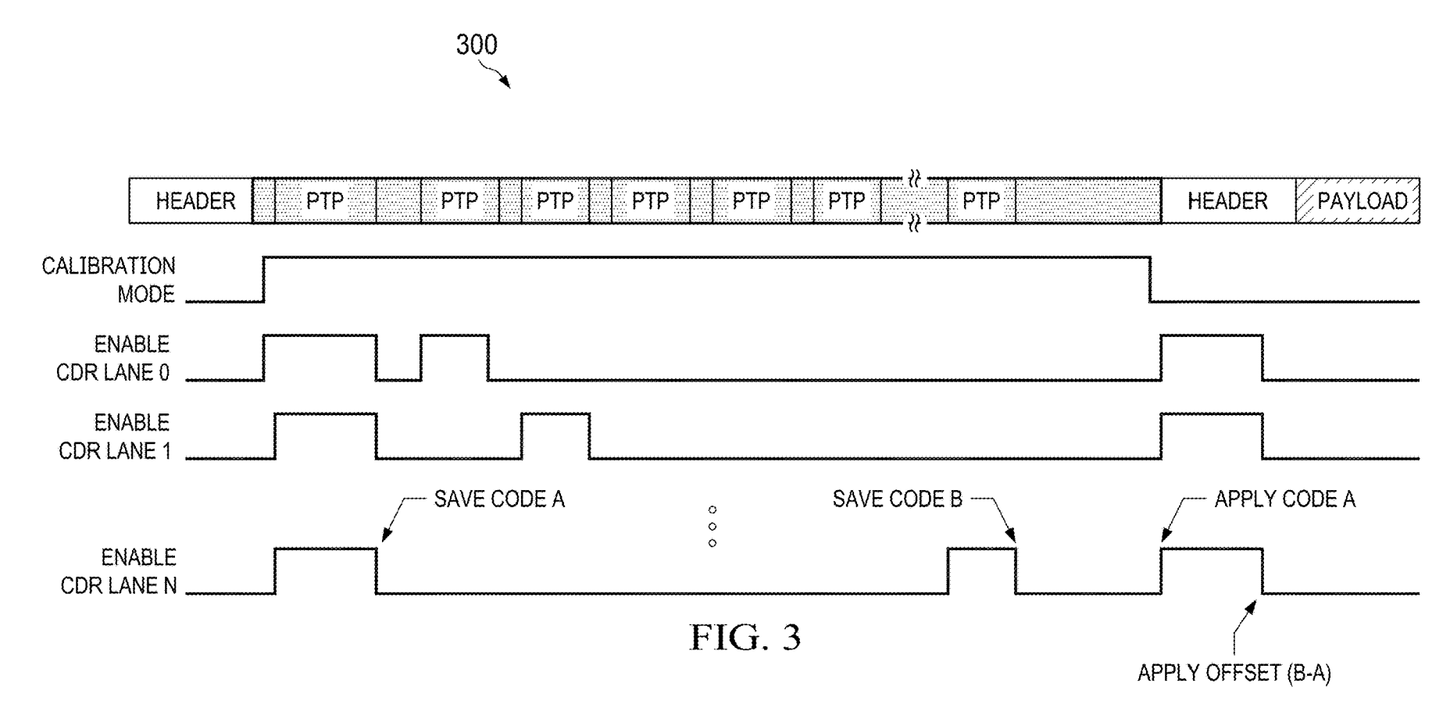
FIG. 3 is a timing diagram of an example receiver.

FIG. 3 is a timing diagram 300 of an example of the receiver 104. Accordingly, reference may be made to components of the receiver 104, described above with reference to other figures. As described above, in at least some examples, the receiver 104 is capable of operation in a calibration mode, such as responsive to power-up of the receiver 104, the receiver 104 being in a link-training mode, or the receiver 104 receiving an asserted CAL signal. The diagram 300 shows an example of a received data frame, a calibration mode enable signal, a CDR Lane 0 enable signal, a CDR Lane 1 enable signal, and a CDR Lane N enable signal. In at least some examples, the header of the data frame includes a SCW, as described above. Responsive to the SCW indicating that the receiver 104 should enter the calibration mode, a component of the receiver 104 (e.g., such as, although not shown with respect to the receiver 104, a processor) may assert the calibration mode enable signal. While the calibration mode enable signal is asserted, and responsive to receipt of a PTP following the header in the received data frame, the receiver 104 may assert each of the CDR Lane 0, CDR Lane 1, and CDR Lane N enable signals. As shown in the diagram 300, for each lane of the CDR circuit 112, responsive to a falling edge of the enable signal for a respective lane of the CDR circuit 112, the state machine 202 may save a value of the clock interpolator code received from the CDR circuit 112 for that particular lane as a code A. The receiver 104 may subsequently enable each lane of the CDR circuit 112 one at a time responsive to receipt of a next PTP and, responsive to a falling edge of the enable signal for a respective lane of the CDR circuit 112, save a value of the clock interpolator code received from the CDR circuit 112 for that particular lane as a code B. The state machine 202 may subsequently determine OFFSET for each lane of the CDR circuit 112 as being a value of code B for a respective lane of the CDR circuit 112 minus code A for that same respective lane of the CDR circuit 112.

Subsequent to determining OFFSET for each lane of the CDR circuit 112, and responsive to receipt of another data frame (e.g., a second or subsequent data frame), the state machine 202 may provide code A as OFFSET. For example, the state machine 202 may provide code A as the digital offset value while all lanes of the CDR circuit 112 are active or enabled. Prior to an end of a header of the second data frame, the state machine 202 may provide OFFSET having the determined value of code B minus code A for each lane of the CDR circuit 112. In some examples, the state machine 202 may provide OFFSET having the determined value M bits prior to the beginning of the SCW of the header, where M is any suitable integer value, and in at least some examples has a same value as N.

Figure 4:
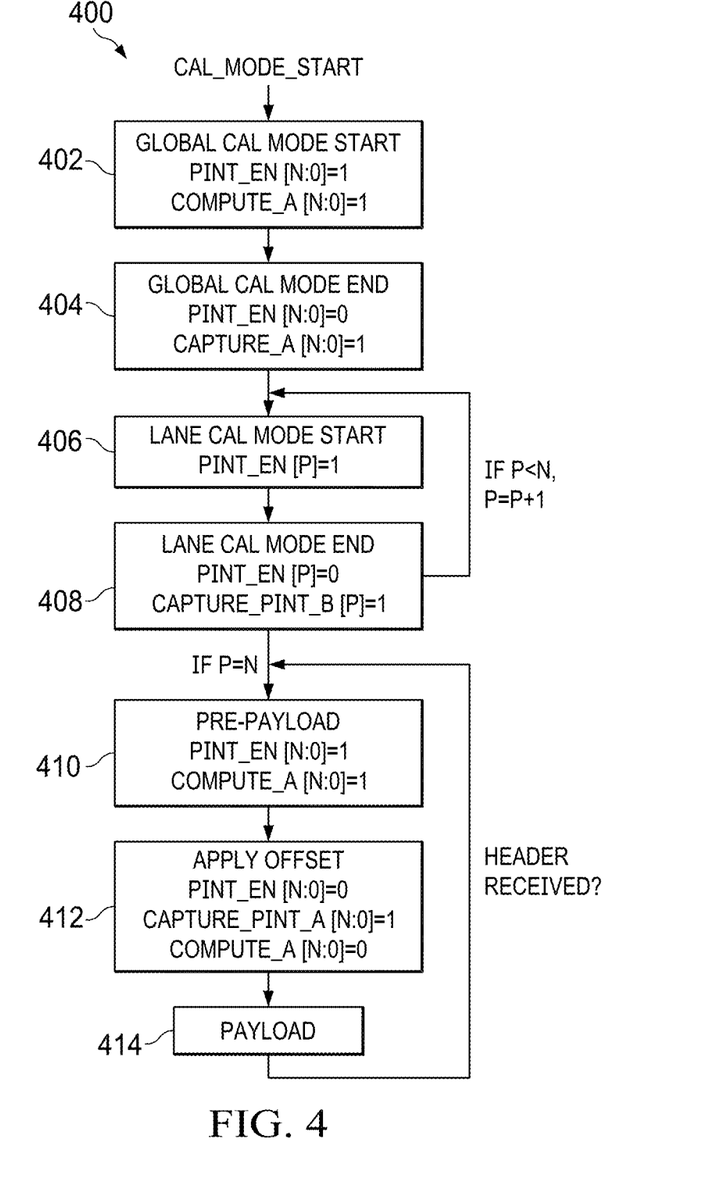
FIG. 4 is a state diagram of an example state machine.

FIG. 4 is a state diagram 400 for an example state machine. In at least some examples, the state diagram 400 is representative of operation of, and/or is implemented by, the state machine 202 of the receiver 104.

At state 402, a global calibration mode (GBL Cal Mode) starts. In some examples, the global calibration mode begins responsive to power-up or reset of the receiver 104. In other examples, the global calibration mode may be re-entered by the receiver 104 during operation, subsequent to having already performed calibration in the global calibration mode since a last power-up or reset of the receiver 104. The global calibration mode may perform a calibration of the receiver 104 to determine a clock interpolator code for each lane of the receiver 104 in parallel (e.g., while all lanes of the receiver 104 are enabled), such as to determine code A for each lane, as described above. In at least some examples, the global calibration mode begins responsive to receipt by the state machine 202 of a control signal (CAL MODE START) having an asserted value. In at least some examples, the state machine 202 provides a control signal PINT_EN to the CDR circuit 112 to control which lanes of the CDR circuit 112 are active. For example, PINT_EN may be an enabling and/or disabling signal for the CDR circuit 112. In at least some examples PINT_EN may be a signal having multiple bits, or may be representative of multiple signal lines (such as arranged in a data bus [M:0]) that each are assigned a single bit, where M is equal to one fewer than a number of lanes of the CDR circuit 112 such that a number of bits of PINT_EN is equal to the number of lanes of the CDR circuit 112. In at least some examples, PINT_EN may be defined as a range of bits [N:0], which may be referred to collectively as PINT_EN[N:0]. A particular bit of PINT_EN that may be provided to a lane of the CDR circuit 112 may be referred to as PINT_EN[P], where P is selected from the set [N:0]. In at least some examples of operation, each bit of PINT_EN [N:0] may have an asserted value (e.g., such as a digital logic value of 1) while operating in state 402. Operation of the state machine 202 remains in state 402, in at least some examples, for a sufficient amount of time (or a sufficient number of clock cycles), for code A to be determined for each lane of the CDR circuit 112, after which operation of the state machine 202 transitions to state 404.

At state 404, the global calibration mode ends. In at least some examples, each bit of PINT_EN[N:0] may have a deasserted value (e.g., such as a digital logic value of 0) while operating in state 404, disabling the CDR circuit 112. In some examples, the CDR circuit 112 being disabled prevents updating of an output signal of the CDR circuit 112. However, a most recently provided signal of the CDR circuit 112, such as an output signal of the CDR circuit 112 immediately prior to the CDR circuit 112 being disabled, may continue to be provided by the CDR circuit 112 while the CDR circuit 112 is disabled. In some examples, the state machine 202 provides a control signal CAPTURE_PINT_A [N:0] to the receiver 104, such as to the register 206. A particular bit of CAPTURE_PINT_A that may be provided to the register 206 may be referred to as CAPTURE_PIN-T_A[P], where P is selected from the set [N:0]. Each bit of CAPTURE_PINT_A[N:0] may be provided to a register 206 respectively corresponding to a lane of the CDR circuit 112. In at least some examples of operation, each bit of CAPTURE_PINT_A[N:0] may have an asserted value (e.g., such as a digital logic value of 1) while operating in state 404. Responsive to the asserted value of CAPTURE_PINT_A[P], a register 206 receiving CAPTURE_PINT_A[P] may store a received value, such as the determined code A, as described above, for a respective lane of the CDR circuit 112 as identified by P. Subsequently, the state machine 202 may begin a lane calibration mode (Lane Cal Mode). To begin the lane calibration mode, the state machine 202 transitions to state 406.

At state 406, the lane calibration mode starts. For example, PINT_EN[P] may be provided to the CDR circuit 112 having an asserted value beginning with PINT_EN[0] responsive to the state machine 202 transitioning from state 404 to state 406. In examples in which the state machine 202 is transitioning to state 406 from some other state, a different bit M of PINT_EN[N:0] may have an asserted value. Operation of the state machine 202 remains in state 406, in at least some examples, for a sufficient amount of time (or a sufficient number of clock cycles), for code B, as described above, to be determined for a particular lane M of the CDR circuit 112 for which PINT_EN[P] is asserted, after which operation of the state machine 202 transitions to state 408.

At state 408, the lane calibration mode ends. For example, the lane calibration mode may end for the particular lane N of the CDR circuit 112 for which PINT_EN[P] was asserted in state 406. Accordingly, the state machine 202 may provide PINT_EN[P] to the CDR circuit 112 having a deasserted value while operating in the state 408. In some examples, the state machine 202 provides a control signal CAPTURE_PINT_B[P] to the receiver 104, such as to the register 208. In at least some examples of operation, CAPTURE_PINT_B[P] may have an asserted value (e.g., such as a digital logic value of 1) while operating in state 408. Responsive to the asserted value of CAPTURE_PINT_B[P], a register 208 receiving CAPTURE_PINT_B[P] may store a received value, such as the determined code B, as described above, for a respective lane of the CDR circuit 112 as identified by M.

Subsequently, in some implementations, the state machine 202 may determine whether to return to state 406 or proceed to state 410. If P is less than N, the state machine 202 may increment a value of P by 1 and return to state 406, such as to perform lane calibration for a next lane of the CDR circuit 112 until all lanes of the CDR circuit 112 have undergone lane calibration. If P is not less than N, the calibration of the CDR circuit 112 may be complete and the state machine 202 may proceed to state 410. In other implementations, the state machine 202 may perform the lane calibration of each, or at least some, lanes of the CDR circuit 112 in any suitable order, such as an arbitrary or randomly determined order, a reverse order, etc.

At state 410, the state machine 202 may perform a pre-payload operation. In some examples, while operating in the state 410, the state machine 202 provides a control signal COMPUTE_A[N:0] to the adder 204. A particular bit of COMPUTE_A[N:0] that may be provided to the adder 204 may be referred to as COMPUTE_A[P]. Each bit of COMPUTE_A[N:0] may be provided to an adder 204 respectively corresponding to a lane of the CDR circuit 112. In at least some examples of operation, each bit of COMPUTE_A[N:0] may have an asserted value (e.g., such as a digital logic value of 1 in some implementations or a digital logic value of 0 in other implementations) while operating in state 410. Responsive to COMPUTE_A[P] having an asserted value, the adder 204 may pass through a value provided by the register 206 unaltered (e.g., a value approximately equal to code A). Responsive to COMPUTE_A[P] having a deasserted value, the adder 204 may determine OFFSET for the respective lane M of the CDR circuit 112 by subtracting code A, as provided by the register 206, from code B, as provided by the register 208, and adding or subtracting any additional programmed offset received by the adder 204. In at least some examples of operation, each bit of PINT_EN [N:0] may also have an asserted value (e.g., such as a digital logic value of 1 in some implementations or a digital logic value of 0 in other implementations) while operating in state 410. Operation of the state machine 202 remains in state 410, in at least some examples, for a sufficient amount of time (or a sufficient number of clock cycles), for a signal representative of OFFSET, as determined by the adder 204, to settle, after which the state machine 202 proceeds to state 412.

At state 412, the receiver 104 applies OFFSET, such as by the adder 204 providing OFFSET to the clock generator 110 to compensate for a change in supply voltage provided to the clock generator 110 based on disabling of the CDR circuit 112, as described above. Accordingly, in at least some examples, the CDR circuit 112 is disabled (e.g., PINT_EN [N:0] may have a deasserted value) while operating in state 412 and/or state 414 as described below. Further, COMPUTE_A[N:0] may have a deasserted value during state 412 to cause the adder 204 to calculate and provide OFFSET. Also, CAPTURE_PINT_A[N:0] may have an asserted value to cause the register 206 to update a stored value of code A to a value most recently provided by the CDR circuit 112.

At state 414, the receiver 104 receives and processes a payload. For example, the receiver 104 may process the payload at least partially using the data sampler 108. In at least some examples, the receiver 104 processes the payload based on, or using, OFFSET, as applied or provided at state 412. Responsive to the receiver 104 detecting a new header in a received payload, the state machine 202 may return to state 410. In at least some examples, processing the payload based on, or using, the determined offset applied at state 412 improves performance of the receiver 104 and mitigates erroneous data reads by compensating for drift in a sampling clock with which the payload is sampled, such as caused by disabling the CDR circuit 112 while the receiver 104 processes the payload.

Figure 5:
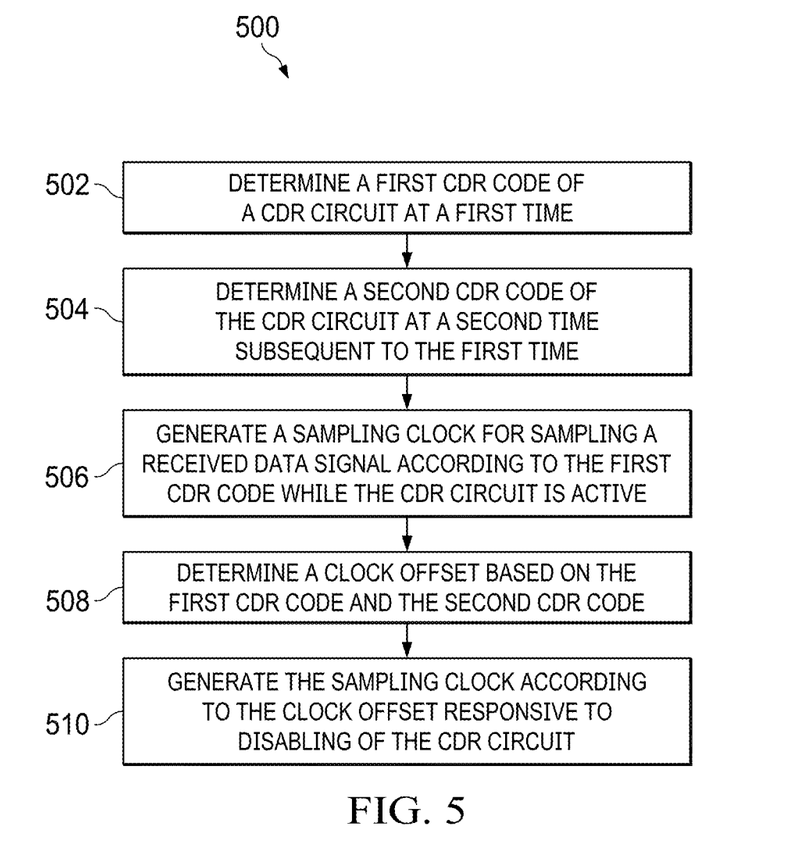
FIG. 5 is a flowchart of an example method.

FIG. 5 is a flowchart of an example method 500 for generating a sampling clock. In at least some examples, the method 500 may be implemented by the receiver 104, as described above herein. Accordingly, reference may be made in describing the method 500 to components and/or signals described above with respect to any of the figures of this description. In at least some examples, the method 500 may be implemented to generate a sampling clock including a clock offset determined according to first and second CDR codes.

At operation 502, a first CDR code is determined at a first time. In at least some examples, the first CDR code is determined according to, or based on, a PTP, as described above herein. For example, the first CDR code may be determined during a calibration or training operation of the receiver 104. The first CDR code may be determined by the CDR circuit 112. In at least some examples, the first CDR code is determined while all, or multiple, lanes of the CDR circuit 112 are active, as described above herein.

At operation 504, a second CDR code is determined at a second time subsequent to the first time. In at least some examples, the second CDR code is determined according to, or based on, a PTP, as described above herein. For example, the second CDR code may be determined during a calibration or training operation of the receiver 104. The second CDR code may be determined by the CDR circuit 112 while a single lane of multiple lanes of the CDR circuit 112 is active.

At operation 506, a sampling clock is generated for sampling a received data signal according to the first CDR code while the CDR circuit is active. In at least some examples, the clock generator 110 may generate the sampling clock based on a received clock signal and the first CDR code, as described above herein.

At operation 508, a clock offset is determined based on the first CDR code and the second CDR code. For example, the clock offset may be determined by the adder 204 subtracting the first CDR code from the second CDR code. In at least some examples, to determine the clock offset the adder 204 also adds a programmed offset to a result of the subtraction of the first CDR code from the second CDR code. In other examples, the first CDR code and the second CDR code may be added rather than subtracted.

At operation 510, the sampling clock is generated according to the clock offset responsive to disabling of the CDR circuit. In at least some examples, the clock generator 110 may generate the sampling clock based on the received clock signal and the determined clock offset, as described above herein.

In this description, the term "couple" may cover connections, communications or signal paths that enable a functional relationship consistent with this description. For example, if device A provides a signal to control device B to perform an action, then: (a) in a first example, device A is directly coupled to device B; or (b) in a second example, device A is indirectly coupled to device B through intervening component C if intervening component C does not substantially alter the functional relationship between device A and device B, so device B is controlled by device A via the control signal provided by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may be adapted to be coupled to those components to form the described circuitry or device. For example, a structure described as including one or more semiconductor elements (such as transistors), one or more passive elements (such as resistors, capacitors and/or inductors), and/or one or more sources (such as voltage and/or current sources) may include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, such as by an end-user and/or a third party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in series or in parallel between the same two nodes as the single resistor or capacitor.

Uses of the phrase "ground voltage potential" in this description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value.

Modifications are possible in the described examples, and other examples are possible, within the scope of the claims.

What is claimed is:

1. An apparatus comprising:
   a clock generator configured to determine a sampling clock based on a received input clock and a clock offset;
   a clock data recovery (CDR) circuit configured to:
      determine a phase of the input clock; and
      determine CDR codes based on the determined phase and sampled data;
   logic configured to:
      record a first CDR code of the CDR codes at a first time;
      record a second CDR code of the CDR codes at a second time subsequent to the first time; and
      determine a calibrated offset based on the first CDR code and the second CDR code; and
   an adder configured to determine the clock offset according to the CDR codes and the calibrated offset.

2. The apparatus of claim 1, wherein the CDR codes have values configured to instruct the apparatus to position a rising edge of the sampling clock in time to occur at a middle of a unit interval of input data while the CDR circuit is active.

3. The apparatus of claim 2, wherein the CDR circuit is configured to be disabled subsequent to determining the CDR codes, and wherein the CDR circuit being disabled shifts a position in time of the sampling clock to no longer be at the middle of the unit interval of the input data.

4. The apparatus of claim 3, wherein the clock offset has a value configured to instruct the apparatus to position the rising edge of the sampling clock in time to occur at the middle of the unit interval of the input data subsequent to disabling the CDR circuit.

5. The apparatus of claim 1, wherein the logic is configured to determine a value of the calibrated offset according to the second CDR code minus the first CDR code.

6. The apparatus of claim 1, wherein the adder is configured to add the calibrated offset to the CDR codes to determine the clock offset.

7. The apparatus of claim 6, wherein the adder is configured to add a programmed offset to the calibrated offset and the CDR codes to determine the clock offset.

8. An apparatus comprising:
   a clock data recovery (CDR) circuit configured to:
      determine a first CDR code at a first time;
      determine a second CDR code at a second time subsequent to the first time;
   a clock generator configured to generate a sampling clock for sampling a received data signal according to the first CDR code while the CDR circuit is active; and
   an offset circuit coupled to the clock generator and to the CDR circuit, the offset circuit configured to determine a clock offset based on the first CDR code and the second CDR code; and
   the clock generator further configured to generate the sampling clock according to the clock offset responsive to disabling of the CDR circuit.

9. The apparatus of claim 8, wherein the CDR circuit is further configured to determine CDR codes having values configured to cause a position of a rising edge of the sampling clock to occur at a middle of a unit interval of received input data while the CDR circuit is active.

10. The apparatus of claim 9, wherein the offset circuit is further configured to disable the CDR circuit subsequent to determining the CDR codes, and wherein disabling the CDR circuit shifts a position in time of the sampling clock to no longer be at the middle of the unit interval of input data.

11. The apparatus of claim 10, wherein the clock offset has a value configured to cause a position of the rising edge of the sampling clock to occur at the middle of the unit interval of the input data subsequent to disabling the CDR circuit.

12. The apparatus of claim 8, wherein the offset circuit is further configured to determine a value of the clock offset according to the second CDR code minus the first CDR code.

13. The apparatus of claim 12, wherein the offset circuit is further configured to add the clock offset to the CDR codes to determine the clock offset.

14. The apparatus of claim 13, wherein the offset circuit is further configured to add a programmed offset to the CDR codes to determine the clock offset.

* * * * *